United States Patent [19]
Horng

[11] Patent Number: 6,114,785
[45] Date of Patent: *Sep. 5, 2000

[54] POSITIONING DEVICE FOR A SENSOR ELEMENT OF A MINIATURE FAN

[75] Inventor: Ching-Shen Horng, Kaohsiung, Taiwan

[73] Assignee: Sunonwealth Electric Machine Industry Co., Ltd., Kaohsiung, Taiwan

[ * ] Notice: This patent is subject to a terminal disclaimer.

[21] Appl. No.: 08/954,823

[22] Filed: Oct. 21, 1997

[51] Int. Cl.[7] ............. H02K 11/00; H02K 7/14; H02K 15/02; H02K 21/22

[52] U.S. Cl. ............. 310/68 B; 310/67 R; 310/42; 310/164

[58] Field of Search ............. 310/67 R, 68 B, 310/162, 164, 62, 63, 42

[56] References Cited

U.S. PATENT DOCUMENTS

| | | | |
|---|---|---|---|
| 4,806,808 | 2/1989 | Grecksch et al. | 310/71 |
| 5,093,599 | 3/1992 | Horng | 310/254 |
| 5,245,236 | 9/1993 | Horng | 310/67 R |
| 5,510,726 | 4/1996 | Brady | 324/772 |
| 5,539,263 | 7/1996 | Lee | 310/67 R |
| 5,831,359 | 11/1998 | Jeske | 310/68 R |
| 5,967,763 | 10/1999 | Horng | 310/68 R |

*Primary Examiner*—Clayton LaBalle
*Attorney, Agent, or Firm*—Bacon & Thomas, PLLC

[57] ABSTRACT

A positioning device for a miniature fan includes a coil seat having an axle tube, an upper polar plate assembly, a lower polar plate assembly, and a winding mounted between the upper polar plate assembly and the lower polar plate assembly. A circuit board is mounted to the axle tube and includes a sensor element for activating rotor. The sensor element is located on a line extending from an end edge of the upper polar plate assembly along a direction parallel to a longitudinal axis of the axle tube.

5 Claims, 3 Drawing Sheets

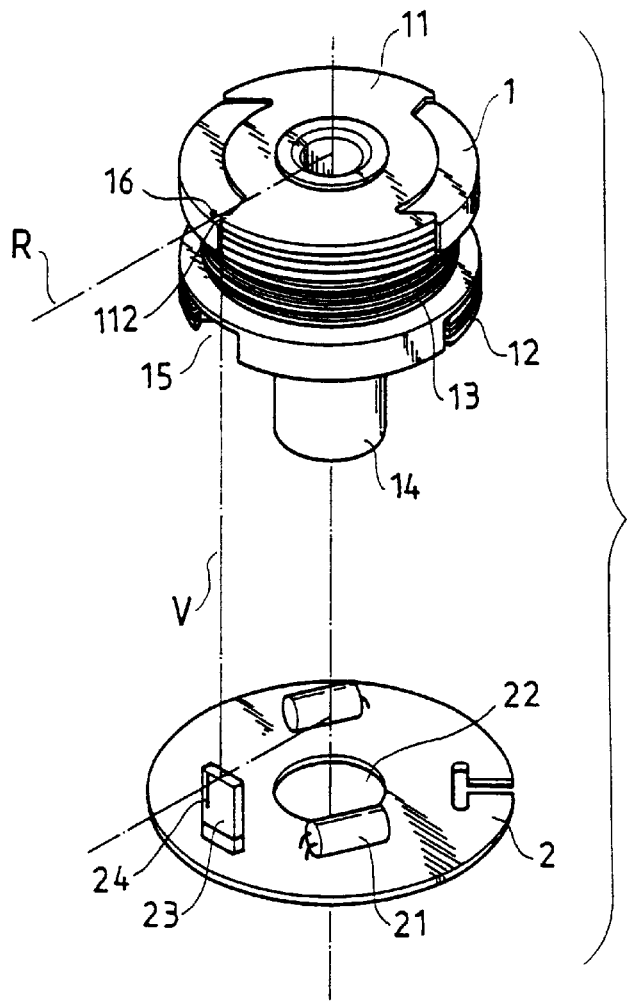
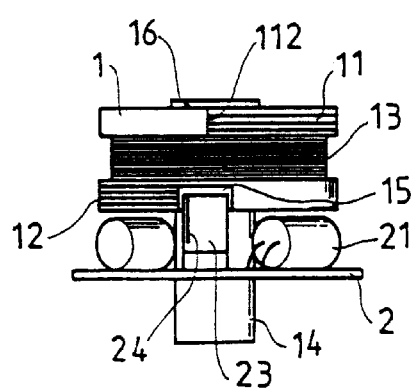
FIG. 5

POSITIONING DEVICE FOR A SENSOR ELEMENT OF A MINIATURE FAN

BACKGROUND OF THE INVENTION

1. Field of the Invention

The present invention relates to a positioning device for a sensor element of a miniature fan.

2. Description of the Related Art

A wide variety of miniature fans have been provided. For example, U.S. Pat. No. 5,492,458 discloses an electric fan including a housing having a hub formed in the center, a shaft having one end force-fitted in the hub and having an annular flange formed in the other end, two polar plates force-fitted on the shaft, and a stator disposed between the polar plates. Nevertheless, the starting effect of the motor of such an electric fan is not satisfactory since the sensor element on the circuit board for starting cannot be accurately aligned with an end edge of the polar plates. The present invention is intended to provide a positioning device for the sensor element which mitigates and/or obviates the above problems.

SUMMARY OF THE INVENTION

It is a primary object of the present invention to provide a positioning device which can align the sensor element on the circuit board accurately with an end edge of the polar plates.

Another object of the present invention to provide a positioning device a sensor element of a miniature fan in which the motor of the miniature fan can be easily activated.

A positioning device for a miniature fan in accordance with the present invention comprises a coil seat which, in turn, includes an axle tube, an upper polar plate assembly, a lower polar plate assembly, and a winding mounted between the upper polar plate assembly and the lower polar plate assembly. A circuit board is mounted to the axle tube and includes a sensor element for activating a rotor. The sensor element is located on a vertical line extending from an end edge of the upper polar plate assembly along a direction parallel to a longitudinal axis of the axle tube.

The coil seat includes a first mark formed thereon, and the sensor element includes a second mark formed thereon to be aligned with the first mark so as to assure that the sensor element is located on the line. In an alternative embodiment of the invention, the circuit board includes a third mark to be aligned with the first mark and the second mark so as to assure that the sensor element is located on the vertical line.

In an embodiment of the invention, the lower polar plate assembly includes a notch defined therein in which the sensor element is received. In an alternative embodiment of the invention, the circuit board includes a notch defined therein for receiving the sensor element.

Other objects, advantages, and novel features of the invention will become more apparent from the following detailed description when taken in conjunction with the accompanying drawings.

BRIEF DESCRIPTION OF THE DRAWINGS

FIG. 4 is an exploded perspective view illustrating a third embodiment of the positioning device in accordance with the present invention; and FIG. 5 is a schematic side view of the third embodiment of the positioning device.

DESCRIPTION OF THE PREFERRED EMBODIMENTS

Figure 1:
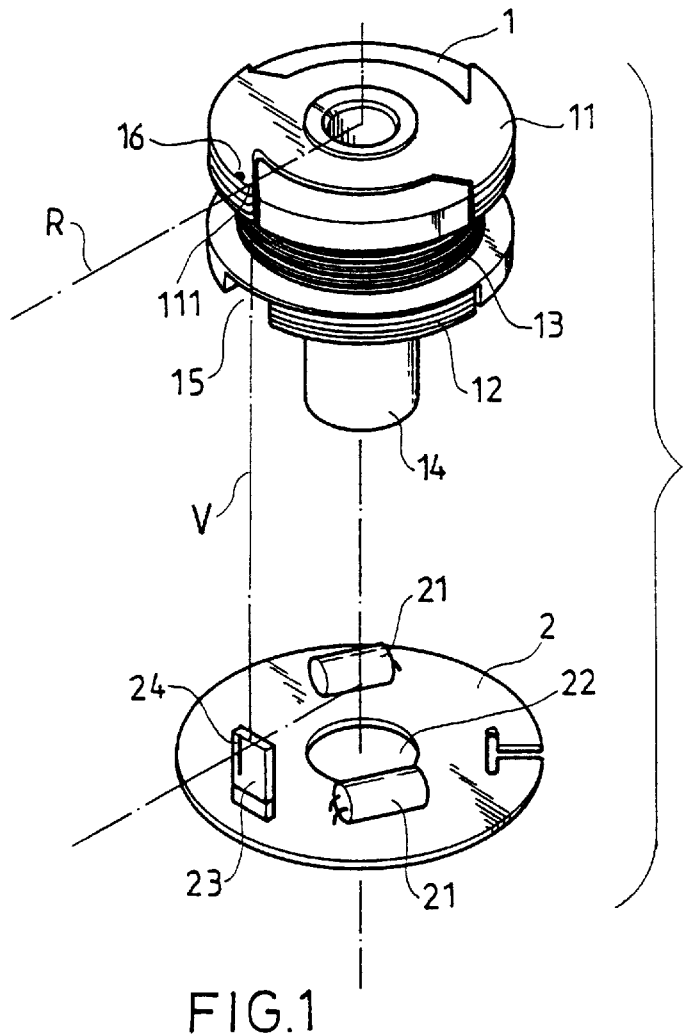
FIG. 1 is an exploded perspective view of a positioning device for miniature fans in accordance with the present invention.
Figure 2:
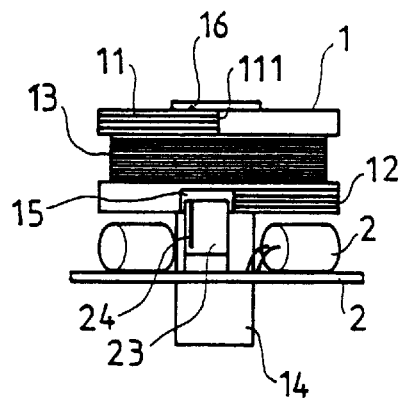
FIG. 2 is a schematic side view of the positioning device in accordance with the present invention.

Referring to the drawings and initially to FIGS. 1 and 2, a positioning device for a sensor element of a miniature fan in accordance with the present invention generally includes a coil seat 1 and a circuit board 2. The coil seat 1 includes an axle tube 14 having an upper polar plate assembly 11, a lower polar plate assembly 12, and a winding 13 mounted between the upper and lower polar plate assemblies 11 and 12. A notch 15 is defined in the lower polar plate assembly 12 in such a manner that an end edge 111 of the upper polar plate assembly 11 locates on a line which resides in an area of the notch 15, i.e., the notch 15 contains a line V which is perpendicular to a radial line R (formed from a center of the coil seat 1 to the end edge 111) and extended from the end edge 111 in a direction parallel to a longitudinal axis of the coil seat 1. The circuit board 2 includes a central opening 22 through which the axle tube 14 extends. The circuit board 2 further includes a plurality of electric elements 21 for controlling the motor and a sensor element 23 which is received in the notch 15 such that the end edge 111 of the upper polar plate assembly 11 aligns with the sensor element 23 so that the line passes through the sensor element of the circuit board. In addition, the upper polar plate assembly 11 includes a first mark 16 adjacent to the end edge 111, and the sensor element 23 includes a corresponding second mark 24. In assembly, the first mark 16 and the second mark 24 are aligned with each other (FIG. 2) to assure alignment of the sensor element 23 and the end edge 111 of the upper polar plate assembly 11. The first mark 16 and the second mark 24 may be lines, dots, etc. By such an arrangement, the sensor element 23 on the circuit board 2 is accurately aligned with the end edge 111 of the upper polar plate assembly 11, thereby providing a reliable starting of a rotor of the motor (not shown), which is conventional and therefore not further described.

Figure 3:
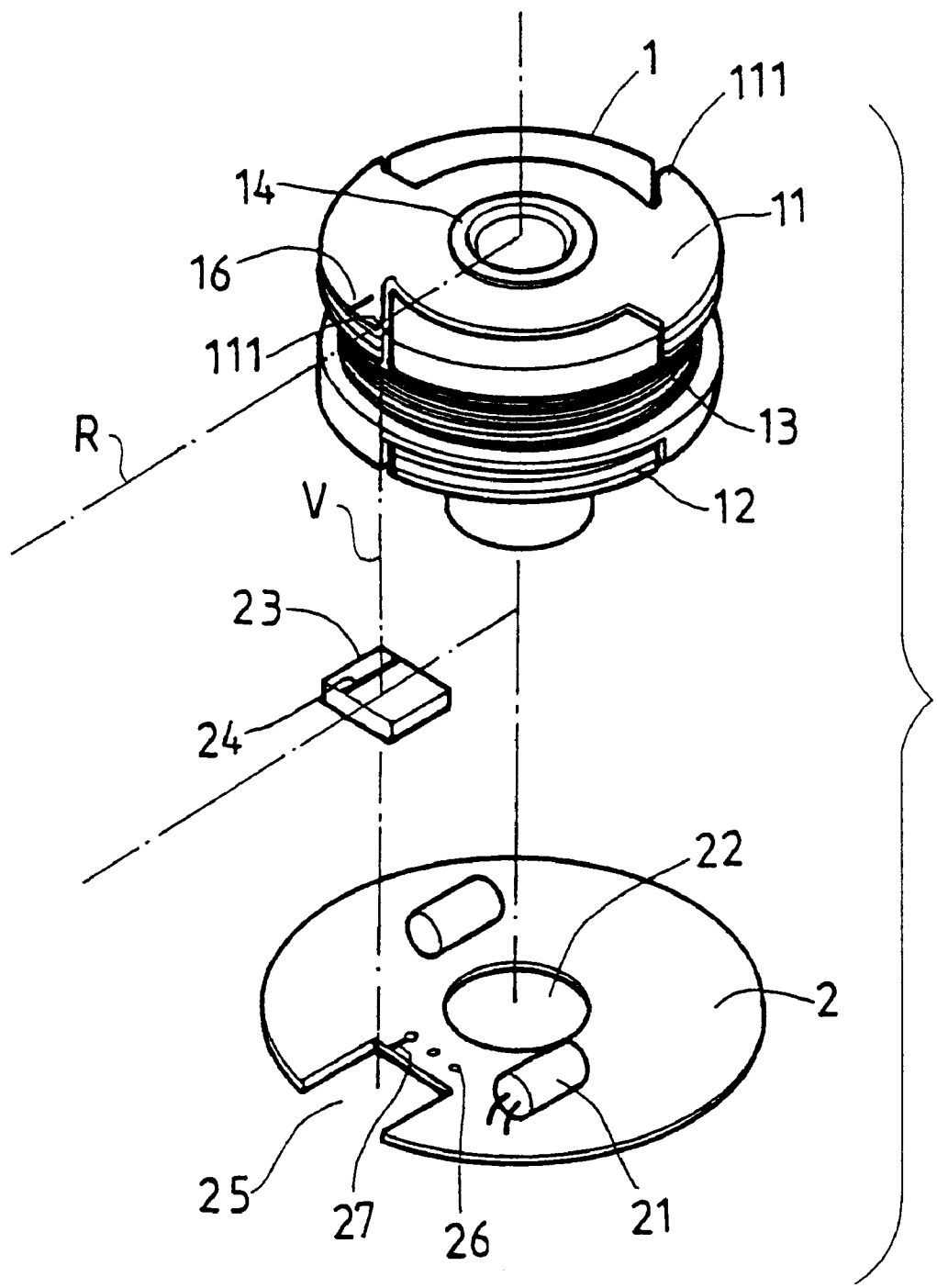
FIG. 3 is an exploded perspective view of a second embodiment of the positioning device in accordance with the present invention.

FIG. 3 illustrates a second embodiment of the positioning device in which the notch 15 defined in the lower polar plate assembly 12 in the first embodiment is omitted, while the circuit board 2 has a notch 25 defined therein for mounting the sensor element 23. In addition, a number of pin holes 26 are defined in the circuit board 2 adjacent to the notch 25 for receiving the pins (not shown) of the sensor element 23, which is conventional and therefore not further described. The upper polar plate assembly 11 includes a first mark 16 adjacent to the end edge 111, the sensor element 23 has a second mark 24 formed thereon, and the circuit board 2 includes a third mark 27 adjacent to the notch 25. The first, second and third marks 16, 24, and 27 may be lines, dots, etc. In assembly, the third mark 27 provides a reference for aligning with the second mark 24 and the first mark 16 such that the sensor element 23 is in alignment with the end edge 111 of the upper polar plate assembly 1, then the line, extending from the edge of the upper polar plate assembly and parallel to a longitudinal axis of the axle tube, passes through the sensor element of the circuit board, thereby providing a reliable activation of the rotor of the motor.

FIGS. 4 and 5 illustrate a third embodiment of the invention, In the first embodiment (FIG. 1) the end edge 111 of the upper polar plate assembly 11, which locates on the line residing in the area of the notch 15, is the so-called "front edge", while in this embodiment, it is the other end edge 112 (the so-called "rear edge") of the upper polar plate assembly 11 which locates on the vertical line residing in the area of the notch 15 defined in the lower polar plate assembly 12. The other arrangement of the third embodiment is identical to that of the first embodiment and is therefore not redundantly described.

In conclusion, the sensor element 23 of the preferred embodiments is located on a line extending from the end edges 111, 112 of the upper polar plate assembly 11 along a direction parallel to a longitudinal axis of the axle tube 14 such that the rotor may be reliably activated to rotate.

Although the invention has been explained in relation to its preferred embodiments, it is to be understood that many other possible modifications and variations can be made without departing from the spirit and scope of the invention as hereinafter claimed.

What is claimed is:

1. A positioning device for a miniature fan, comprising;
   a coil seat including an axle tube, an upper polar plate assembly, a lower polar plate assembly, and a winding mounted between the upper polar plate assembly and the lower polar plate assembly, the upper polar plate assembly including an end edge,
   a circuit board mounted to the axle tube and including a sensor element adapted to activate a rotor, and structural elements situated on a vertical line extending from the end edge of the upper polar plate in a direction parallel to a longitudinal axis of the axle tube,
   wherein said structural elements include said end edge of the upper polar plate assembly and said sensor element, and
   wherein said end edge of the upper polar plate and said sensor element are thereby aligned with each other by being located on said vertical line extending from the end edge of the upper polar plate assembly along a direction parallel to a longitudinal axis of the axle tube.

2. The positioning device according to claim 1, further comprising a first mark formed on the coil seat and a second mark formed on the sensor element, said second mark being aligned with the first mark so as to assure that the sensor element is located on the line.

3. The positioning device according to claim 1, wherein the lower polar plate assembly includes a notch defined therein in which the sensor element is received.

4. The positioning device according to claim 1, wherein the circuit board includes a notch defined therein for receiving the sensor element.

5. The positioning device according to claim 2, wherein the circuit board includes a third mark to be aligned with the first mark and the second mark to assure that the sensor element is located on the line.

* * * * *

Disclaimer 6,114,785—Ching-Shen Horng, Kaohsiung, Taiwan. POSITIONING DEVICE FOR A SENSOR ELEMENT OF A MINIATURE FAN. Patent dated Sept. 5, 2000. Disclaimer filed Dec. 9, 2002, by the assignee, Sunonwealth Electric Machine Industry Co., Ltd.

Hereby enters this disclaimer to claims 1-5, of said patent.

*(Official Gazette, October 7, 2003)*

(12) EX PARTE REEXAMINATION CERTIFICATE (5192nd)
United States Patent
Horng

(10) Number: US 6,114,785 C1
(45) Certificate Issued: Aug. 30, 2005

(54) POSITIONING DEVICE FOR A SENSOR ELEMENT OF A MINIATURE FAN

(75) Inventor: Ching-Shen Horng, Kaohsiung (TW)

(73) Assignee: Sunonwealth Electric Machine Industry Co., Ltd., Kaohsiung (TW)

Reexamination Request:
No. 90/006,267, Apr. 19, 2002

Reexamination Certificate for:
Patent No.: 6,114,785
Issued: Sep. 5, 2000
Appl. No.: 08/954,823
Filed: Oct. 21, 1997

Disclaimer of Claims 1, 2, 3, 4 and 5 Filed Dec. 9, 2002 (O.G. Oct. 7, 2003).

( * ) Notice: This patent is subject to a terminal disclaimer.

(51) Int. Cl.[7] .......................... H02K 11/00; H02K 7/14; H02K 15/02; H02K 21/22

(52) U.S. Cl. .................. 310/68 B; 310/67 R; 310/42; 310/164

(56) References Cited

U.S. PATENT DOCUMENTS

| | | |
|---|---|---|
| 4,429,263 A | 1/1984 | Muller |
| 4,547,714 A | 10/1985 | Muller |
| 4,891,567 A | 1/1990 | Guujitani |
| 5,831,359 A | 11/1998 | Jeske |
| 6,114,785 A | 9/2000 | Horng |

*Primary Examiner*—Charles G Freay

(57) ABSTRACT

A positioning device for a miniature fan includes a coil seat having an axle tube, an upper polar plate assembly, a lower polar plate assembly, and a winding mounted between the upper polar plate assembly and the lower polar plate assembly. A circuit board is mounted to the axle tube and includes a sensor element for activating rotor. The sensor element is located on a line extending from an end edge of the upper polar plate assembly along a direction parallel to a longitudinal axis of the axle tube.

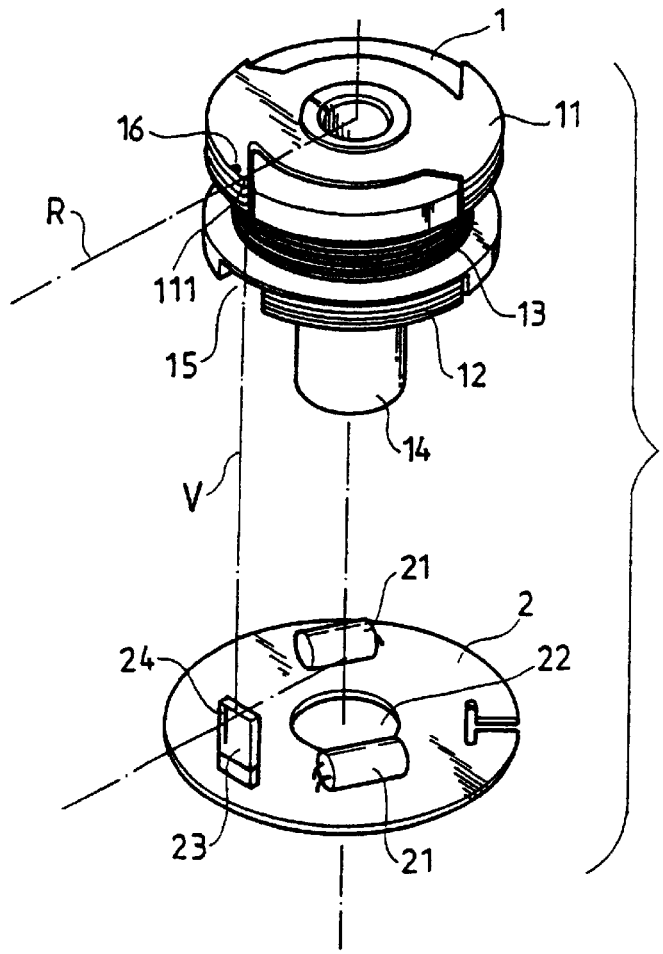

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–5 are now disclaimed.

Claims 1–5 are cancelled.

\* \* \* \* \*